US010368149B2

(12) United States Patent
Jones et al.

(10) Patent No.: US 10,368,149 B2
(45) Date of Patent: Jul. 30, 2019

(54) METHODS AND APPARATUS FOR A COLORLESS DIRECTIONLESS AND SUPER-CHANNEL CONTENTIONLESS (CDSC) OPTICAL NETWORK ARCHITECTURE

(71) Applicant: Juniper Networks, Inc., Sunnyvale, CA (US)

(72) Inventors: Kevan Peter Jones, Kanata (CA); Robert William Keys, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/849,097

(22) Filed: Dec. 20, 2017

(65) Prior Publication Data

US 2019/0191232 A1 Jun. 20, 2019

(51) Int. Cl.
*H04J 14/00* (2006.01)
*H04Q 11/00* (2006.01)
*H04J 14/02* (2006.01)

(52) U.S. Cl.
CPC ........ *H04Q 11/0005* (2013.01); *H04J 14/021* (2013.01); *H04Q 2011/0016* (2013.01); *H04Q 2011/0058* (2013.01)

(58) Field of Classification Search
CPC ............... H04J 14/0212; H04J 14/0217; H04J 14/0205; H04J 14/021; H04J 14/0213;
(Continued)

(56) References Cited

U.S. PATENT DOCUMENTS 7,751,714 B2 * 7/2010 Zhong .................. H04J 14/0241
398/50
7,769,256 B2 * 8/2010 Bai .................. H04B 10/07953
385/14
(Continued)

FOREIGN PATENT DOCUMENTS

WO WO 2014/111212 7/2014

OTHER PUBLICATIONS

Li, Y. et al., "Impact of ROADM Colorless, Directionless, and Contentionless (CDC) Features on Optical Network Performance [Invited]," J. Opt. Commun. Netw., vol. 4, No. 11, B58-B67, Nov. 2012.

*Primary Examiner* — Hibret A Woldekidan
(74) *Attorney, Agent, or Firm* — Cooley LLP

(57) ABSTRACT

In some embodiments, a system includes a super-channel multiplexer (SCM) and an optical cross connect (OXC) switch. The SCM is configured to multiplex a set of optical signals into a super-channel optical signal with a wavelength band. The OXC switch is configured to be operatively coupled to the SCM and a reconfigurable optical add-drop multiplexer (ROADM) degree. The OXC switch is configured to be located between the SCM and the ROADM degree and the OXC switch, the SCM, and the ROADM degree are configured to be included in a colorless, directionless, and contentionless (CDC) optical network. The OXC switch is configured to switch, based on the wavelength band, the super-channel optical signal to an output port from a set of output ports of the OXC switch. The OXC switch is configured to transmit the super-channel optical signal from the output port to the ROADM degree.

16 Claims, 7 Drawing Sheets

(58) Field of Classification Search
CPC .... H04J 14/0209; H04J 14/0271; H04J 14/00; H04J 14/02; H04J 14/0201; H04J 14/0291; H04Q 11/0005; H04Q 2011/0016; H04Q 2011/0024; H04Q 2011/0058; H04Q 2213/13295; H04Q 2011/0081; H04B 10/27
USPC ... 398/44, 48, 50, 56, 68, 83–85, 2, 4, 5, 45
See application file for complete search history.

(56) References Cited

U.S. PATENT DOCUMENTS

| | | | | |
|---|---|---|---|---|
| 7,817,918 B2* | 10/2010 | Guild | ................. | H04J 14/0212 398/45 |
| 8,406,622 B2* | 3/2013 | Doverspike | ........ | H04Q 11/0062 398/34 |
| 8,457,496 B2* | 6/2013 | Zami | ................. | H04J 14/0204 398/48 |
| 8,761,601 B2* | 6/2014 | Doverspike | ........ | H04Q 11/0062 398/49 |
| 8,903,242 B2 | 12/2014 | Atlas et al. | | |
| 9,215,028 B2* | 12/2015 | Mehrvar | ............. | H04J 14/0212 |
| 10,027,435 B2* | 7/2018 | Guy | ................... | H04J 14/0246 |
| 10,123,100 B2* | 11/2018 | Sato | ................... | H04J 14/0212 |
| 2004/0208546 A1* | 10/2004 | Alaimo | ............... | H04J 14/0204 398/49 |
| 2008/0181605 A1* | 7/2008 | Palacharla | .......... | H04J 14/0204 398/50 |
| 2009/0232497 A1* | 9/2009 | Archambault | ...... | H04J 14/0206 398/50 |
| 2011/0280581 A1* | 11/2011 | Chann | .................. | G02B 6/2931 398/98 |
| 2012/0207470 A1* | 8/2012 | Djordjevic | ............. | H04B 10/25 398/44 |
| 2013/0195449 A1* | 8/2013 | Ghioni | ................ | H04J 14/0204 398/48 |
| 2014/0140692 A1* | 5/2014 | Oda | .................... | H04B 10/5057 398/23 |
| 2014/0376918 A1* | 12/2014 | Boduch | ................ | H04J 14/021 398/83 |
| 2015/0333835 A1* | 11/2015 | Matsukawa | ........... | H04B 10/60 398/48 |
| 2016/0057519 A1 | 2/2016 | Hand et al. | | |
| 2016/0191189 A1 | 6/2016 | Mitchell | | |
| 2016/0315701 A1* | 10/2016 | Yuki | .................... | H04J 14/0221 |
| 2017/0279528 A1* | 9/2017 | Huang | ............. | H04B 10/07955 |
| 2017/0279538 A1* | 9/2017 | Sone | .................. | H04B 10/2575 |

* cited by examiner

METHODS AND APPARATUS FOR A COLORLESS DIRECTIONLESS AND SUPER-CHANNEL CONTENTIONLESS (CDSC) OPTICAL NETWORK ARCHITECTURE

BACKGROUND

Some embodiments described herein relate generally to methods and apparatus for a colorless, directionless, and contentionless (CDC) optical network architecture. In particular, but not by way of limitation, some embodiments described herein relate to methods and apparatus for a modular CDC optical network architecture optimized for super-channels and individual channels.

A reconfigurable optical add/drop multiplexer (ROADM) node can provide flexibility and reconfigurability for an optical network. Such capabilities enable network operators to quickly and flexibly respond to network changes, such as establishing new optical paths or releasing existing optical paths. These ROADM capabilities enable some known modern optical networks to achieve colorlessness, directionlessness, and contentionlessness (CDC) and provide improved efficiency of the optical networks. Known solutions to build an optical network with CDC capabilities include a multi-cast switch (MCS)-based structure and an optical cross connect (OXC) switch-based structure. The MCS-based structure, however, typically does not scale and is not cost efficient when the ROADM node includes more than four directions. The OXC-based structure often uses very large OXC switches, which are not scalable and are potential single points of failure. In addition, an optical network using a known MCS-based structure or a known OXC-based structure may only implement 1:1 protection scheme, which typically has a slower restoration compared to 1+1 protection scheme.

Accordingly, a need exists for methods and apparatus to provide a scalable and highly capable optical network structure with CDC capabilities and 1+1 protection scheme.

SUMMARY

In some embodiments, a system includes a super-channel multiplexer and an optical cross connect (OXC) switch. The super-channel multiplexer is configured to multiplex a set of optical signals into a super-channel optical signal with a wavelength band. Each optical signal from the set of optical signals has a wavelength from a set of wavelengths that is included within the wavelength band. The OXC switch is configured to be operatively coupled to the super-channel multiplexer and a reconfigurable optical add-drop multiplexer (ROADM) degree. The OXC switch is configured to be located between the super-channel multiplexer and the ROADM degree. The OXC switch, the super-channel multiplexer, and the ROADM degree are configured to be included in a colorless, directionless, and contentionless (CDC) optical network. The OXC switch is configured to switch, based on the wavelength band, the super-channel optical signal to an output port from a set of output ports of the OXC switch. The OXC switch is configured to transmit the super-channel optical signal from the output port to the ROADM degree.

In some embodiments, an apparatus includes a set of input ports, a set of output ports and a processor operatively coupled to the set of input ports and the set of output ports. At least one input port from the set of input ports is configured to be operatively coupled to a super-channel multiplexer. The set of output ports is configured to be operatively coupled to a set of reconfigurable optical add-drop multiplexer (ROADM) degrees. The processor is configured to be included in a colorless, directionless, and contentionless optical network and is configured to receive a super-channel optical signal from the super-channel multiplexer via the at least one input port from the set of input ports. The super-channel optical signal includes a wavelength band. The processor is configured to send, based on the wavelength band, the super-channel optical signal to a ROADM degree from the set of ROADM degrees via an output port from the set of output ports.

DETAILED DESCRIPTION

Figure 1:
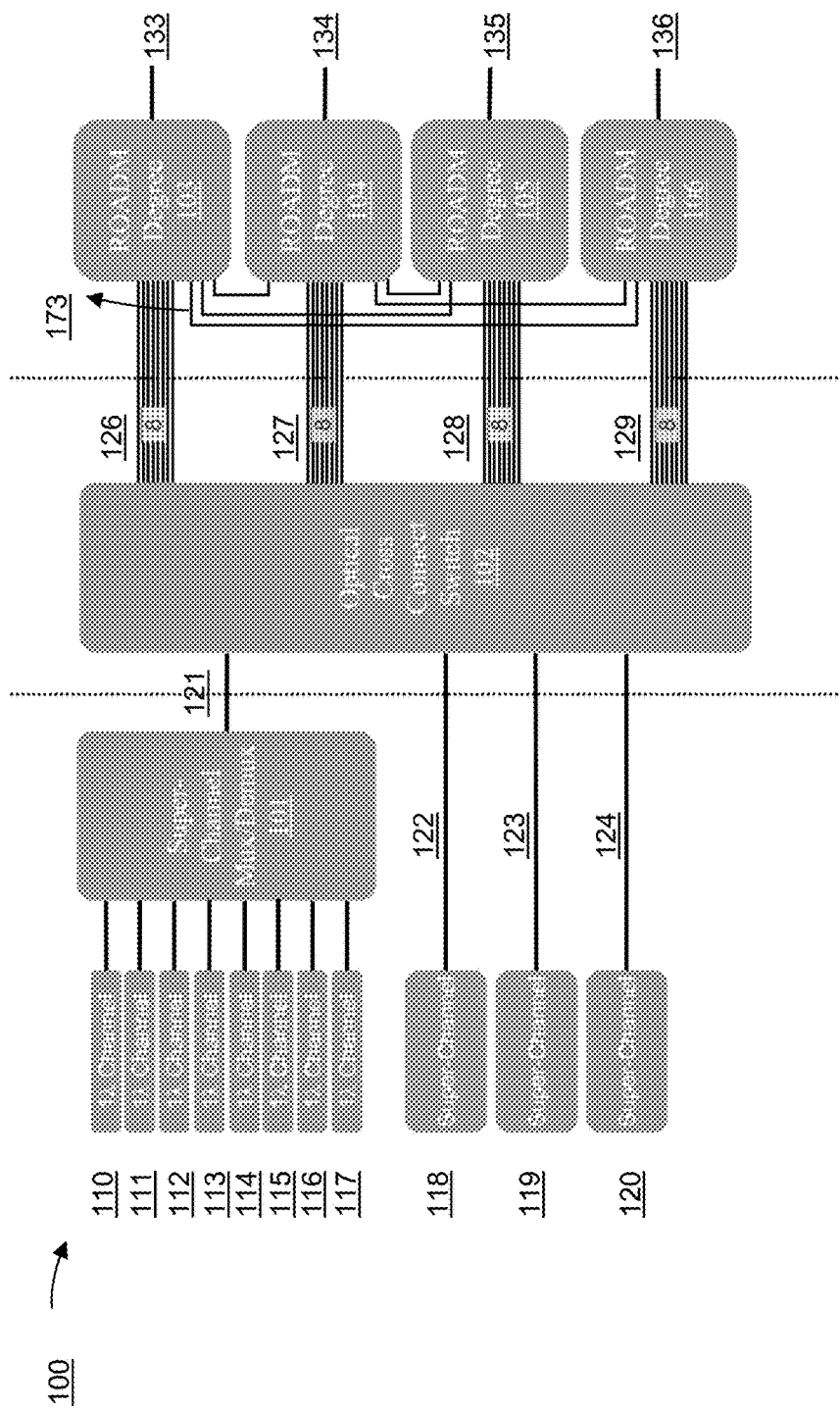
FIG. 1 is a block diagram illustrating a colorless, directionless, and super-channel contentionless (CDsC) reconfigurable optical add/drop multiplexer (ROADM) node, according to an embodiment.

A reconfigurable optical add/drop multiplexer (ROADM) node is a device that can add, drop, block, pass, equalize, or redirect light waves of various wavelengths in an optical network (or an optical transport network.) The add/drop port capabilities of ROADM nodes allow the optical network to achieve colorless, directionless, and contentionless (CDC). A ROADM node can include multiple switching directions (i.e., ROADM degrees) and each switching direction of the ROADM node (i.e., each ROADM degree) can include a set of add/drop ports that can transmit light waves of various wavelengths in an optical network. In some implementations, a ROADM degree in a ROADM node includes optical components configured to receive a set of optical signals and transmit the set of optical signals to a device external to the ROADM node or to one or more components in the ROADM node. The ROADM degree in the ROADM node can also include other optical components (e.g., a multiplexer/demultiplexer module) or electronic components (e.g., a process, a memory.) In a colorless optical network, each add/drop port of an ROADM node is not restricted (or fixedly assigned) to a single wavelength. In some implementations, the wavelength assigned for each add/drop port of an ROADM node is programmable. In other words, an optical signal with any optical wavelength can be added/dropped at any port of a ROADM degree (i.e., color independent.) In a directionless optical network, an optical signal with any optical wavelength can be routed to any direction (or any add/drop port) of a ROADM node, by software control, and without physical rewiring (i.e., direction independent). In a contentionless optical network, optical signals with the same optical wavelengths can be added and dropped at the next available port of the ROADM node without colliding. In other words, an optical wavelength can be assigned to more than one routing direction within the ROADM node without colliding. Some embodiments described herein provide a modular, customizable, and scalable architecture for advanced ROADM optical networks with CDC capabilities. Some embodiments described herein provide improved optimization over known solutions to CDC architecture and divide the management functionality into a hierarchy that allows simplified operations and automation.

Some embodiments described herein provide an optimized solution for high capacity super-channels as well as the capabilities of CDC for individual channels. Super-channels are multi-carrier signals that use a contiguous part of the optical spectrum and are optically routed as a single "super-channel," thus reducing the filtering penalties and allowing very large bandwidths to be managed. Some embodiments described herein provide a colorless, directionless, and super-channel contentionless (CDsC) optical network system that not only provides high data rate capabilities, but reduce the number of input ports used for the optical cross connect (OXC) switches, thus simplifying the design and the management of the optical network.

In some embodiments, a system includes a super-channel multiplexer and an optical cross connect (OXC) switch. The super-channel multiplexer is configured to multiplex a set of optical signals into a super-channel optical signal with a wavelength band. Each optical signal from the set of optical signals has a wavelength from a set of wavelengths that is included within the wavelength band. The OXC switch is configured to be operatively coupled to the super-channel multiplexer and a reconfigurable optical add-drop multiplexer (ROADM) node. The OXC switch is configured to be located between the super-channel multiplexer and the ROADM node. The OXC switch, the super-channel multiplexer, and the ROADM node are configured to be included in a colorless, directionless, and contentionless (CDC) optical network. The OXC switch is configured to switch, based on the wavelength band, the super-channel optical signal to an output port from a set of output ports of the OXC switch. The OXC switch is configured to transmit the super-channel optical signal from the output port to the ROADM node.

In some embodiments, an apparatus includes a set of input ports, a set of output ports and a processor operatively coupled to the set of input ports and the set of output ports. At least one input port from the set of input ports is configured to be operatively coupled to a super-channel multiplexer. The set of output ports is configured to be operatively coupled to a set of reconfigurable optical add-drop multiplexer (ROADM) degrees. The processor is configured to be included in a colorless, directionless, and contentionless optical network and is configured to receive a super-channel optical signal from the super-channel multiplexer via the at least one input port from the set of input ports. The super-channel optical signal includes a wavelength band. The processor is configured to send, based on the wavelength band, the super-channel optical signal to a ROADM degree from the set of ROADM degrees via an output port from the set of output ports.

As used in this specification, the singular forms "a," "an" and "the" include plural referents unless the context clearly dictates otherwise. Thus, for example, the term "a port" is intended to mean a single port or ports. For another example, the term "an optical amplifier" is intended to mean a single optical amplifier or multiple optical amplifiers.

FIG. 1 is a block diagram illustrating a colorless, directionless, and super-channel contentionless (CDsC) reconfigurable optical add/drop multiplexer (ROADM) node, according to an embodiment. The CDsC ROADM node 100 can be configured to transmit and/or receive optical signals. For example, the CDsC ROADM node 100 can be a wavelength division multiplexing (WDM) system, such as a dense wavelength division multiplexing (DWDM) system. In some embodiments, the CDsC ROADM node 100 includes an optical fiber(s) carrying a set of single-carrier optical channels 110-117 and a set of integrated super-channels 118-120, a super-channel multiplexer/demultiplexer 101, an optical cross connect (OXC) switch 102, and a set of reconfigurable optical add/drop multiplexers (ROADM) degrees 103-106. The OXC switch 102 can be configured to be located communicatively between the super-channel multiplexer 101 and the ROADM degrees 103-106. In other words, data flow is communicated to the OXC switch 102 from the super-channel multiplexer 101 and the data flow is output from the OXC switch 102 to the ROADM degrees 103-106. In some implementations, each component of the CDsC ROADM node 100 (i.e., the optical fibers that carry the set of single-carrier optical channels 110-117 and the set of integrated super-channels 118-120, the super-channel multiplexer/demultiplexer 101, the OXC switch 102, and the set of ROADM degrees 103-106) is a hardware device and/or software (executed on a processor and/or stored in memory) implemented within the CDsC ROADM node 100.

The super-channel multiplexer/demultiplexer 101 can be operatively coupled to an optical fiber(s) carrying a set of optical channels 110-117 and the OXC switch 102. Each optical channel from the set of optical channels 110-117 can carry an optical signal from a set of optical signals at a wavelength from a set of wavelengths. The set of wavelengths of the set of optical signals spans a first wavelength band. The super-channel multiplexer/demultiplexer 101 can be configured to multiplex the set of optical signals from the set of optical channels 110-117 into a super-channel optical signal 121. The super-channel optical signal 121 is a multi-carrier signal with a second wavelength band. In some instances, the second wavelength band of the super-channel optical signal 121 is equal to the first wavelength band of the set of optical signals 110-117. In some instances, the second wavelength band of the super-channel optical signal 121 includes a set of wavelength bands. The sum of the set of wavelength bands is greater than or equal to the first wavelength band of the set of optical signals 110-117.

For example, an optical network system that uses a C-Band transmission window (e.g., a wavelength range band from 1530 nm to 1565 nm in a DWDM system) supports a bandwidth of 4.8 THz. In some instances, the transmission window can be divided into 96 individual channels (i.e., 96 single carrier optical signals) and each individual channel from the 96 individual channels has a band of frequency of 50 GHz. In other instances, it can be divided into 128 channels (i.e., 128 single carrier optical signals) and each individual channel from the 128 individual channels has a band of frequency of 37.5 GHz. In yet other instances, it can be divided into 16 super-channels and each super-channel from the 16 super-channels has a band of frequency of 300 GHz. In yet other instances, it can be divided into 32 super-channels and each super-channel from the 32 super-channels has a band of frequency of 150 GHz.

The OXC switch 102 can be operatively coupled to the super-channel multiplexer/demultiplexer 101, an optical fiber(s) carrying a set of integrated super-channels 118-120, and a set of ROADM degrees 103-106. The OXC switch 102 includes a set of input ports (not shown in the figure), a set of output ports (not shown in the figure), a memory (not shown in the figure), and a processor (not shown in the figure) operatively coupled to the set of input ports, the set of output ports and the memory. The OXC switch 102 can be configured to direct an optical signal received via one of the set of input ports to a ROADM degree 103-106 via one of the set of output ports. The optical signal can be a super-channel optical signal 121 received from the super-channel multiplexer/demultiplexer 101, a super-channel optical signal 122-124 received from an integrated super-channel 118-120 (e.g., an optical transponder), or a single carrier optical signal (not shown in the figure) received from an individual optical channel (not shown in the figure.) The super-channel optical signal 122-124 sent from the integrated super-channel 118-120 is not multiplexed by the super-channel multiplexer/demultiplexer 101. In some instances, the OXC switch 102 can be symmetric with a number of the set of input ports equal to a number of the set of output ports. In other instances, the OXC switch 102 can be asymmetric with a number of the set of input ports different from a number of the set of output ports. In some implementations, as discussed herein with regards to FIG. 2, a dual plane OXC switch can be used to provide redundant protection. Details of the OXC switch 102 are discussed below with regards to FIG. 5.

The reconfigurable optical add/drop multiplexer (ROADM) degree 103-106 can be operatively coupled to the OXC switch 102. The ROADM degree 103-106 can be configured to add, drop, block, pass, equalize, or redirect optical signals of various wavelengths. In some implementations, a ROADM degree 103-106 in a ROADM node 100 includes optical components configured to receive a set of optical signals and transmit the set of optical signals to a device external to the ROADM node 100 or to one or more components in the ROADM node 100. The ROADM degree 103-106 in the ROADM node 100 can also include other optical components (e.g., a multiplexer/demultiplexer module) or electronic components (e.g., a process, a memory.) The ROADM degree 103-106 can be implemented by planar lightwave circuit (PLC) devices (not shown in the figure) or wavelength selective switching (WSS) devices (not shown in the figure.) A ROADM node 100 can have two directions (2D) of switching, four directions (4D) of switching (as shown in the figure), eight directions (8D) of switching, or more than eight directions. When a ROADM node 100 has four directions of switching, a ROADM degree 103-106 can be operatively coupled to three other ROADM degrees 103-106. In such instances, when the ROADM degree 103 receives an optical signal from the OXC switch 102, the ROADM degree 103 can process the optical signal at the ROADM degree 103. In other instances, pass-through connections exist from an output port of a ROADM degree 103-106 to the other ROADM degrees 103-106 such that optical signals 133-136 can be passed through other ROADM degrees 103-106. For example, an optical signal 133 can be transmitted to a ROADM degree 106 from the ROADM degree 103 via a pass-through connection 173. The ROADM degrees 103-106 can multiplex the optical signals and output an optical signal 133-136 to an optical network (not shown in the figure.)

In some implementations, an optical amplifier (not shown in the figure) can be placed between the super-channel multiplexer/demultiplexer 101 and the OXC switch 102 and operatively coupled to the super-channel multiplexer/demultiplexer 101 and the OXC switch 102. The optical amplifier can amplify the super-channel optical signal received from the super-channel multiplexer/demultiplexer 101 to generate an amplified super-channel optical signal. The optical amplifier can send the amplified super-channel optical signal to the OXC switch 102. By placing the optical amplifier between the super-channel multiplexer/demultiplexer 101 and the OXC switch 102, the CDsC ROADM node 100 can provide an improved optical signal to noise ratio (OSNR) and save implementation costs of the ROADM node 100.

In use, the super-channel multiplexer/demultiplexer 101 receives a set of single-carrier optical signals from an optical fiber(s) carrying a set of individual channels 110-117. The super-channel multiplexer/demultiplexer 101 multiplexes the set of single carrier optical signals and generates a super-channel optical signal 121. Each optical signal from the set of optical signals has a wavelength from a set of wavelengths. The set of wavelengths of the set of optical signals spans a first wavelength band. The super-channel optical signal 121 is a multi-carrier signal with a second wavelength band. In some instances, the second wavelength band of the super-channel optical signal 121 is equal to the first wavelength band of the set of optical signals 110-117. In some instances, the second wavelength band of the super-channel optical signal 121 includes a set of wavelength bands. The sum of the set of wavelength bands is greater than or equal to the first wavelength band of the set of optical signals 110-117.

The super-channel multiplexer/demultiplexer 101 sends the super-channel optical signal 121 to the OXC switch 102. The OXC switch 102 can receive a set of super-channel optical signals 122-124 from a set of integrated super-channels 118-120. The super-channel optical signal 122-124 received from the integrated super-channel 118-120 is not multiplexed by the super-channel multiplexer/demultiplexer 101. The OXC switch 102 then directs the super-channel optical signals 126-129 to the set of ROADM degrees 103-106 via the set of output ports (not shown in the figure) of the OXC switch 102. The ROADMs 103-106 add/drop the received super-channel optical signals 126-129 and output the optical signals 133-136 to an optical network (not shown in the figure.) In some instances, pass-through connections exist from an output port of a ROADM degree 103-106 to the other ROADM degrees 103-106 such that optical signals 133-136 can be passed through other ROADM degrees 103-106. For example, an optical signal 133 can be transmitted to a ROADM degree 106 from the ROADM degree 103 via a pass-through connection 173.

In the CDsC ROADM node 100, an optical signal with any optical wavelength can be added/dropped at any port of an ROADM degree 103-106 in any direction without wavelength collision. Similarly stated, in the CDsC ROADM node 100, each add/drop port of an ROADM node 100 is not restricted (or fixedly assigned) to a single wavelength. In some implementations, the wavelength assigned for each add/drop port of an ROADM node 100 is programmable. In other words, an optical signal with any optical wavelength can be added/dropped at any port of an ROADM node 100 (i.e., color independent or colorless.) In the CDsC ROADM node 100, an optical signal with any optical wavelength can be routed to any direction (or any add/drop port) of an ROADM degree 103-106, by software control, and without physical rewiring (i.e., direction independent or directionless). In the CDsC ROADM node 100, optical signals with the same optical wavelengths can be added and dropped at the next available port of the ROADM node 100 without colliding. In other words, an optical wavelength can be assigned to more than one routing direction within the ROADM node 100 without colliding (i.e., contentionless). The CDsC ROADM node 100 not only provides high data rate capabilities, but reduces the number of input ports used (or required) for the OXC switch 102 as well, thus simplifying the design and the management of the optical network.

For example, for a four-direction ROADM node 100, the CDsC ROADM node 100 can achieve 25% add/drop rate in every direction of the ROADM nodes with an OXC switch 102 having thirty-two (32) input ports and thirty-two (32) output ports. The CDsC ROADM node 100 can achieve 50% add/drop rate in every direction of the ROADM nodes with an OXC switch 102 having sixty-four (64) input ports and sixty-four (64) output ports. The CDsC ROADM node 100 can achieve 100% add/drop rate in every direction of the ROADM nodes with an OXC switch 102 having 128 input ports and 128 output ports.

Figure 2:
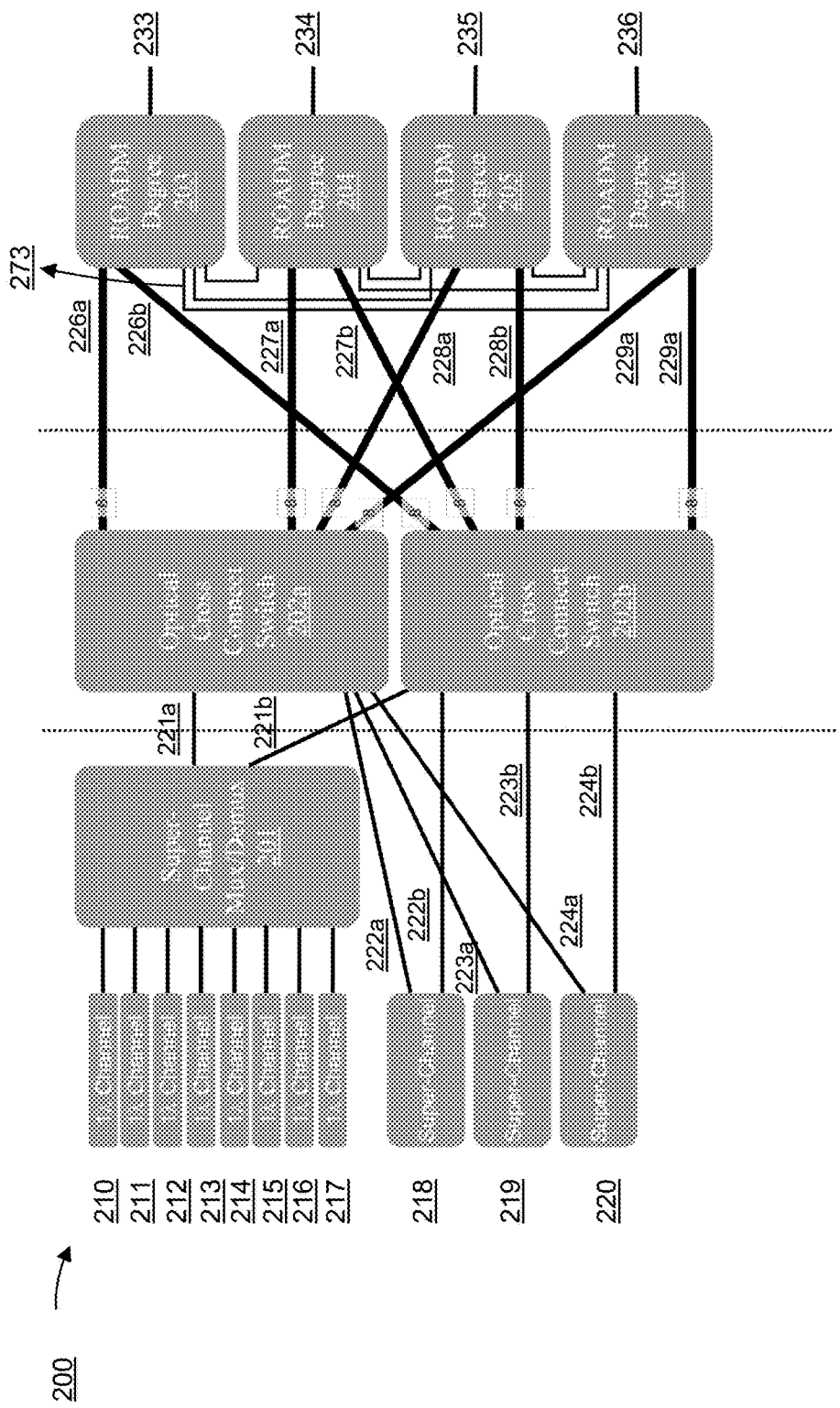
FIG. 2 is a block diagram illustrating a colorless, directionless, and super-channel contentionless (CDsC) ROADM node with dual-plane switching, according to an embodiment.

FIG. 2 is a block diagram illustrating a colorless, directionless, and super-channel contentionless (CDsC) ROADM node 200 with dual-plane switching, according to an embodiment. The CDsC ROADM node 200 includes an optical fiber(s) carrying a set of single-carrier optical channels 210-217 and a set of integrated super-channels 218-220, a super-channel multiplexer/demultiplexer 201, a set of ROADM degrees 203-206, and dual-plane optical cross connect (OXC) switches 202a and 202b. The CDsC ROADM node 200 with dual-plane switching can provide dual-output for redundant connection and rapid restoration. The set of single-carrier optical channels 210-217, the set of integrated super-channels 218-220, the super-channel multiplexer/demultiplexer 201, and the set of ROADM degrees 203-206 are structurally and functionally similar to the set of single-carrier optical channels 110-117, the set of integrated super-channels 118-120, the super-channel multiplexer/demultiplexer 101, and the set of ROADMs 103-106 in FIG. 1, respectively. The OXC switch 202a and the OXC switch 202b are structurally and functionally similar to the OXC switch 102 in FIG. 1. The OXC switches 202a and 202b can be configured to be located communicatively between the super-channel multiplexer/demultiplexer 201 and the ROADM degrees 203-206. In other words, data flow is communicated to the OXC switches 202a-202b from the super-channel multiplexer 201 and the data flow is output from the OXC switches 202a-202b to the ROADM degree 203-206.

In use, the super-channel multiplexer/demultiplexer 201 receives a set of single-carrier optical signals from an optical fiber(s) carrying the set of individual channels 210-217. The super-channel multiplexer/demultiplexer 201 multiplexes the set of single carrier optical signals and generates a first super-channel optical signal 221a. In some instances, the super-channel multiplexer/demultiplexer 201 duplicates the first super-channel optical signal 221a to generate a second super-channel optical signal 221b. Each optical signal from the set of optical signals has a wavelength from a set of wavelengths. The set of wavelengths of the set of optical signals spans a first wavelength band. The first super-channel optical signal 221a and the second super-channel optical signal 221b are multi-carrier signals with a second wavelength band. In some instances, the second wavelength band of the super-channel optical signals 221a and 221b is equal to the first wavelength band of the set of optical signals 210-217. In some instances, the second wavelength band of the super-channel optical signal 221a or 221b includes a set of wavelength bands. The sum of the set of wavelength bands is greater than or equal to the first wavelength band of the set of optical signals 210-217.

The super-channel multiplexer/demultiplexer 201 sends the first super-channel optical signal 221a to the first OXC switch 202a and sends the second super-channel optical signal 221b to the second OXC switch 202b. The first OXC switch 202a can receive a set of super-channel optical signals 222a-224a from a set of integrated super-channels 218-220. The second OXC switch 202b can receive the duplicate set of super-channel optical signals 222b-224b from the set of integrated super-channels 218-220. The super-channel optical signals 222a-224b received from the integrated super-channels 218-220 are not multiplexed by the super-channel multiplexer/demultiplexer 201. The first OXC switch 202a then directs the super-channel optical signals 226a-229a to the set of ROADM degrees 203-206 via the set of output ports (not shown in the figure) of the first OXC switch 202a. In some instances, in the event that the first OXC switch 202a fails or a connection coupled to the first OXC switch 202a fails, the second OXC switch 202b can also direct the super-channel optical signals 226b-229b to the set of ROADM degrees 203-206. In other instances, the second OXC switch 202b can direct the super-channel optical signals 226b-229b to the set of ROADM degrees 203-206 when the first OXC switch 202a is operational. The ROADM degrees 203-206 add or drop the received super-channel optical signals 226a-229b and output the optical signals 233-236 to an optical network (not shown in the figure.) In some instances, pass-through connections exist from an output port of a ROADM degree 203-206 to the other ROADM degrees 203-206 such that optical signals 233-236 can be passed through other ROADM degrees 203-206. For example, an optical signal 233 can be transmitted to a ROADM degree 206 from the ROADM degree 203 via a pass-through connection 273.

Similar to the CDsC ROADM node 100 in FIG. 1, the CDsC ROADM node 200 with dual-plane switching also provides colorless, directionless, and contentionless capabilities. Additionally, the CDsC ROADM node 200 with dual-plane switching allows for 1+1 super-channel protection and rapid restoration. For example, in the event that the first OXC switch 202a fails or a connection coupled to the first OXC switch 202a fails, the second OXC switch 202b can also direct the super-channel optical signals 226b-229b to the set of ROADM degrees 203-206.

Figure 3A:
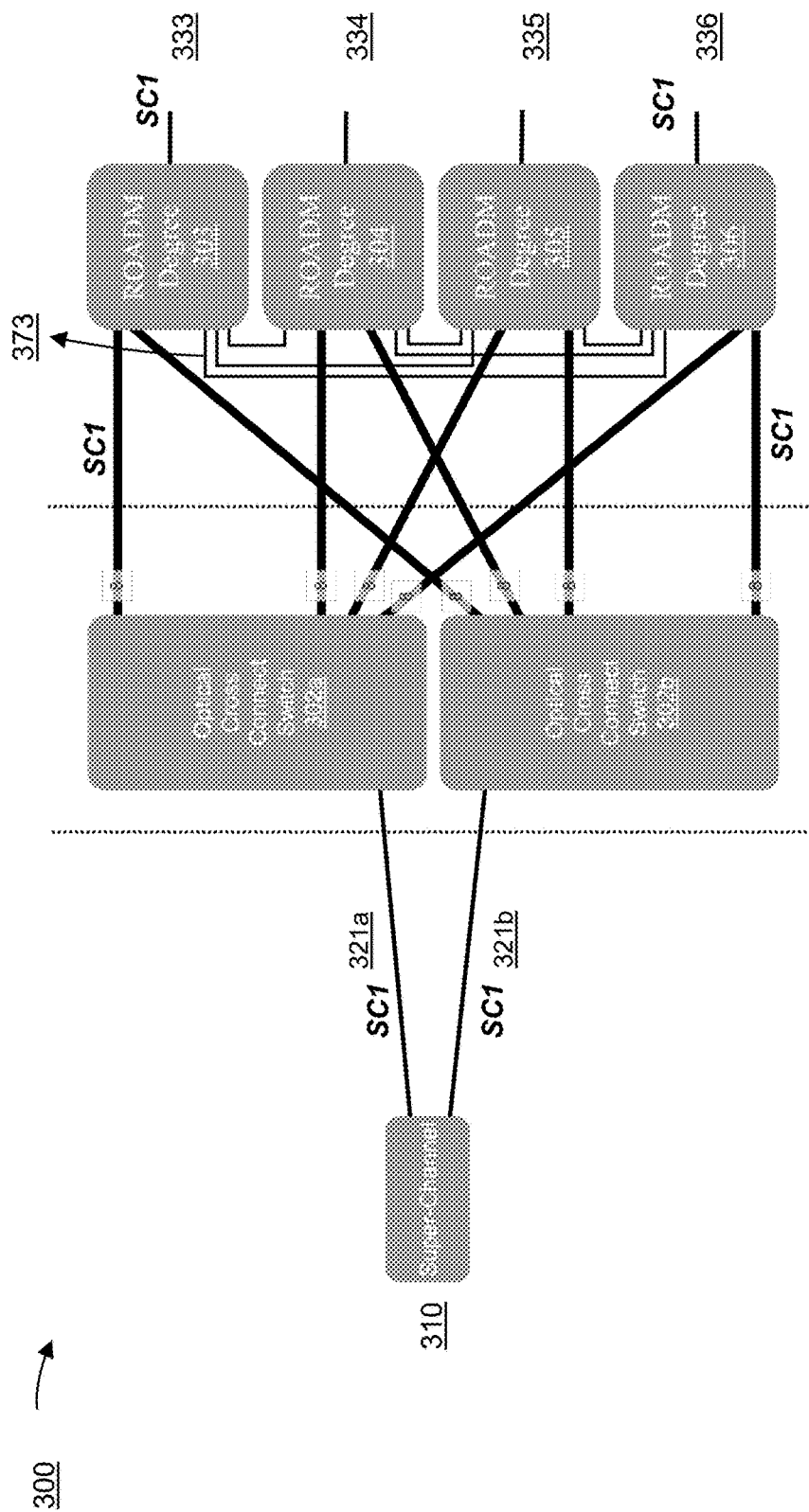
FIGS. 3A-3B are block diagrams illustrating a colorless, directionless, and super-channel contentionless (CDsC) ROADM node with dual modes, according to an embodiment.
Figure 3B:
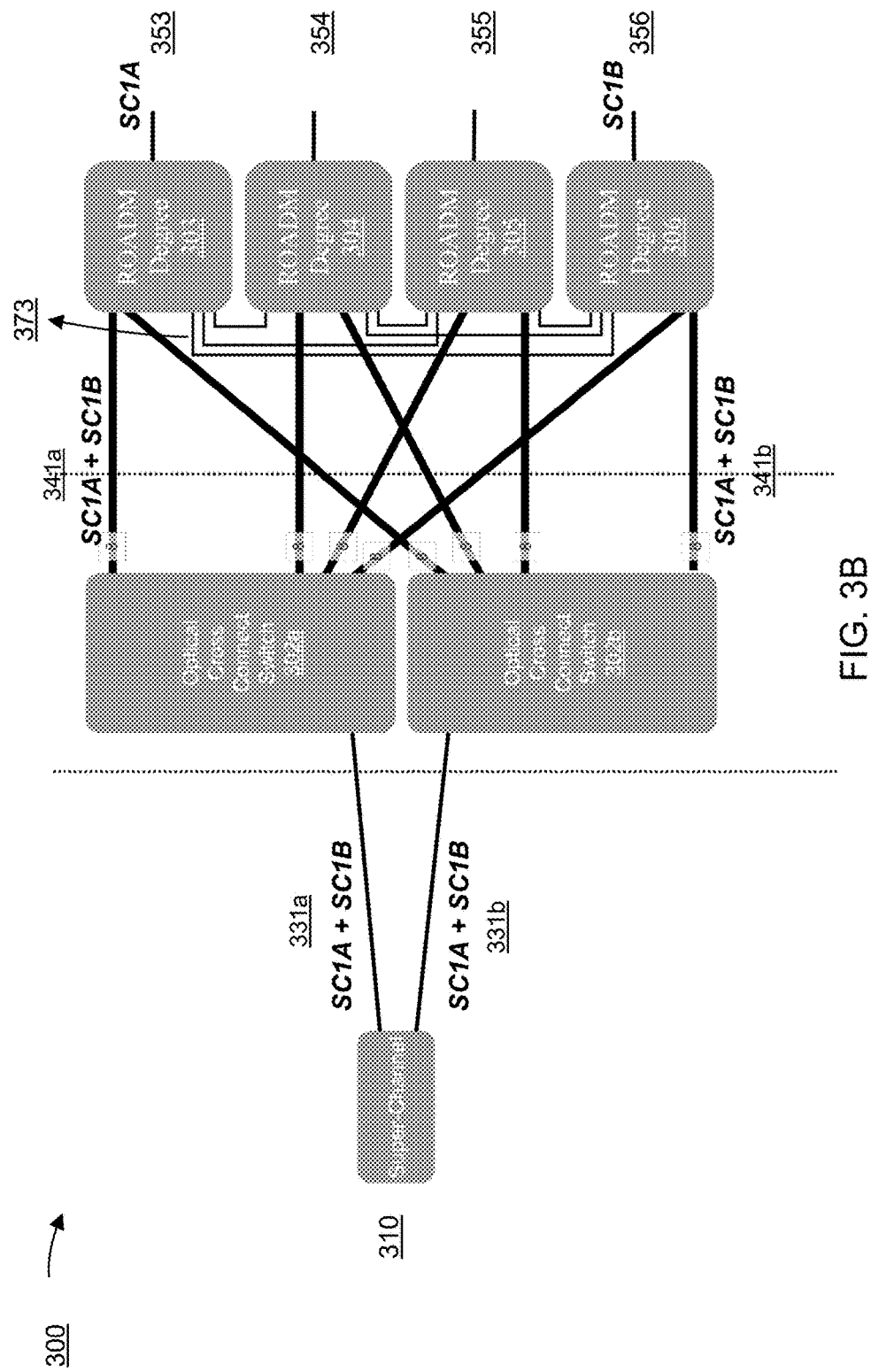

FIGS. 3A-3B are block diagrams illustrating a colorless, directionless, and super-channel contentionless (CDsC) ROADM node 300 with dual modes, according to an embodiment. FIG. 3A shows the CDsC ROADM node 300 in a redundancy protection mode and FIG. 3B shows the CDsC ROADM node 300 in a half super-channel mode, according to an embodiment. The CDsC ROADM node 300 includes an optical fiber(s) carrying a super-channel 310, a set of ROADMs degrees 303-306, dual-plane optical cross connect (OXC) switches 302a and 302b. The CDsC ROADM node 300 can provide dual-output for redundant connection and rapid restoration in the redundancy protection mode (FIG. 3A) as well as half super-channel switching in the half super-channel mode (FIG. 3B). In some instances, the super-channel 310 can be structurally and functionally similar to the set of integrated super-channels 118-120 in FIG. 1. In other instances, the super-channel optical signal 321a can be a super-channel optical signal multiplexed by a super-channel multiplexer/demultiplexer (not shown in the figure) similar to the super-channel multiplexer/demultiplexer 101 in FIG. 1. The set of ROADM degrees 303-306 are structurally and functionally similar to the set of ROADM degrees 103-106 in FIG. 1. The OXC switch 302a and the OXC switch 302b are structurally and functionally similar to the OXC switch 102 in FIG. 1.

FIG. 3A shows the CDsC ROADM node 300 with a redundancy protection mode, according to an embodiment. In use, in some instances, the super-channel 310 carries a first super-channel optical signal 321a. In other instances, a super-channel multiplexer/demultiplexer (not shown in the figure) receives a set of single-carrier optical signals from a set of individual channels (not shown) and multiplexes the set of single carrier optical signals to generate the first super-channel optical signal 321a.

The super-channel 310 duplicates the first super-channel optical signal 321a to generate a second super-channel optical signal 321b. The first super-channel optical signal 321a and the second super-channel optical signal 321b are multi-carrier signals with a wavelength band. For example, an optical network system that uses a C-Band transmission window supports a bandwidth of 4.8 THz. In some instances, it can be divided into 16 super-channels and each super-channel from the 16 super-channels has a band of frequency of 300 GHz (e.g., the super-channel optical signals 321a and 321b). In other instances, it can be divided into 32 super-channels and each super-channel from the 32 super-channels has a band of frequency of 150 GHz (e.g., the super-channel optical signals 321a and 321b).

The first super-channel optical signal 321a is sent to the first OXC switch 302a and the second super-channel optical signal 321b is sent to the second OXC switch 302b. The first OXC switch 302a then routes the first super-channel optical signal 321a to a ROADM degree from the set of ROADM degrees 303-306 via an output port from the set of output ports (not shown in the figure) of the first OXC switch 302a (e.g., ROADM degree 303). The second OXC switch 302b can route the second super-channel optical signal 321b to a ROADM degree from the set of ROADM degrees 303-306 via an output port from the set of output ports (not shown in the figure) of the second OXC switch 302b (e.g., to ROADM degree 306). The ROADM degrees 303-306 add or drop the received super-channel optical signals and output the optical signals 333-336 to an optical network (not shown in the figure.) In some instances, pass-through connections exist from an output port of a ROADM degree 303-306 to the other ROADM degrees 303-306 such that optical signals 333-336 can be passed through other ROADM degrees 303-306. For example, an optical signal 333 can be transmitted to a ROADM degree 306 from the ROADM degree 303 via a pass-through connection 373.

Similar to the CDsC ROADM node 200 in FIG. 2, the CDsC ROADM node 300 in the redundancy protection mode provides colorless, directionless, and contentionless capabilities, as well as dual-plane switching which allows for 1+1 super-channel protection and rapid restoration.

FIG. 3B shows the CDsC ROADM node 300 in a half super-channel mode, according to an embodiment. In use, in some instances, the super-channel 310 (e.g., an integrated super-channel) carries a super-channel optical signal 331a, which is divided into two super-channel optical signals SC1A and SC1B. In other instances, a super-channel multiplexer/demultiplexer (not shown in the figure) receives a set of single-carrier optical signals from a set of individual channels (not shown) and multiplexes the set of single carrier optical signals to generate the first super-channel optical signal 331a. The super-channel duplicates the first super-channel optical signal 331a to provide a second super-channel optical signal 331b.

The first super-channel optical signal 331a and the second super-channel optical signal 331b are multi-carrier signals with a wavelength band. For example, for an optical network system that uses a C-Band transmission window, which supports a bandwidth of 4.8 THz, the transmission window can be divided into 16 super-channels and each super-channel from the 16 super-channels has a frequency band of 300 GHz (e.g., the super-channel optical signals 331a and 331b). The 300 GHz super-channel optical signals 331a and 331b can be divided (equally or not equally) into two smaller super-channel optical signals SC1A and SC1B. In such instances, instead of 16 super-channels, the C-Band transmission window of 4.8 THz is divided into 32 super-channels. For example, when the 300 GHz super-channel optical signal (e.g., 331a) is divided equally, each of the super-channel optical signals SC1A and SC1B can have a bandwidth of 150 GHz. When the 300 GHz super-channel optical signal (e.g., 331a) is divided randomly, the super-channel optical signal SC1A can have, for example, a bandwidth of 100 GHz and the super-channel optical signal SC1B can have a bandwidth of 200 GHz.

The first super-channel optical signal 331a including SC1A and SC1B is sent to the first OXC switch 302a and the second super-channel optical signal 331b including SC1A and SC1B is sent to the second OXC switch 302b. The first OXC switch 302a then routes the first super-channel optical signal 331a to a ROADM degree from the set of ROADM degrees 303-306, for example, to ROADM degree 303, via an output port from the set of output ports (not shown in the figure) of the first OXC switch 302a. The second OXC switch 302b can route the second super-channel optical signal 331b to a ROADM degree from the set of ROADM degrees 303-306, for example, to ROADM degree 306, via an output port from the set of output ports (not shown in the figure) of the second OXC switch 302b. The ROADM degrees 303-306 add or drop the received super-channel optical signals and output the optical signals 353-356 to an optical network (not shown in the figure.) For example, the super-channel optical signal SC1B of the first super-channel optical signal 331a is blocked at the ROADM degree 303 and only the super-channel optical signal SC1A 353 of the first super-channel optical signal 331a is transmitted through the ROADM degree 303. The super-channel optical signal SC1A of the second super-channel optical signal 331b is blocked at the ROADM degree 306 and only the super-channel optical signal SC1B 356 of the first super-channel optical signal 331b is transmitted through the ROADM degree 306. This is beneficial when the two smaller super-channel optical signals SC1A and SC1B are to be transmitted in different directions. In these situations, the ROADM degrees 303-306 can block the unwanted super-channel at its ingress and only transmit the super-channel optical signal(s) that is intended for transmission. In some instances, the division of super-channel optical signals 331a and 331b to smaller super-channel optical signals SC1A and SC1B may also be used for arbitrary wavelength combinations. The division of super-channel optical signals 331a and 331b to smaller super-channel optical signals SC1A and SC1B and the routing of the smaller super-channel optical signals SC1A and SC1B can be programmed and customized by the CDsC ROADM node 300. In some instances, pass-through connections exist from an output port of a ROADM degree 303-306 to the other ROADM degrees 303-306 such that optical signals 333-336 can be passed through other ROADM degrees 303-306. For example, an optical signal 333 can be transmitted to a ROADM degree 306 from the ROADM degree 303 via a pass-through connection 373.

Similar to the CDsC ROADM node 200 in FIG. 2, the CDsC ROADM node 300 in the half super-channel mode provides colorless, directionless, and contentionless capabilities.

Figure 4:
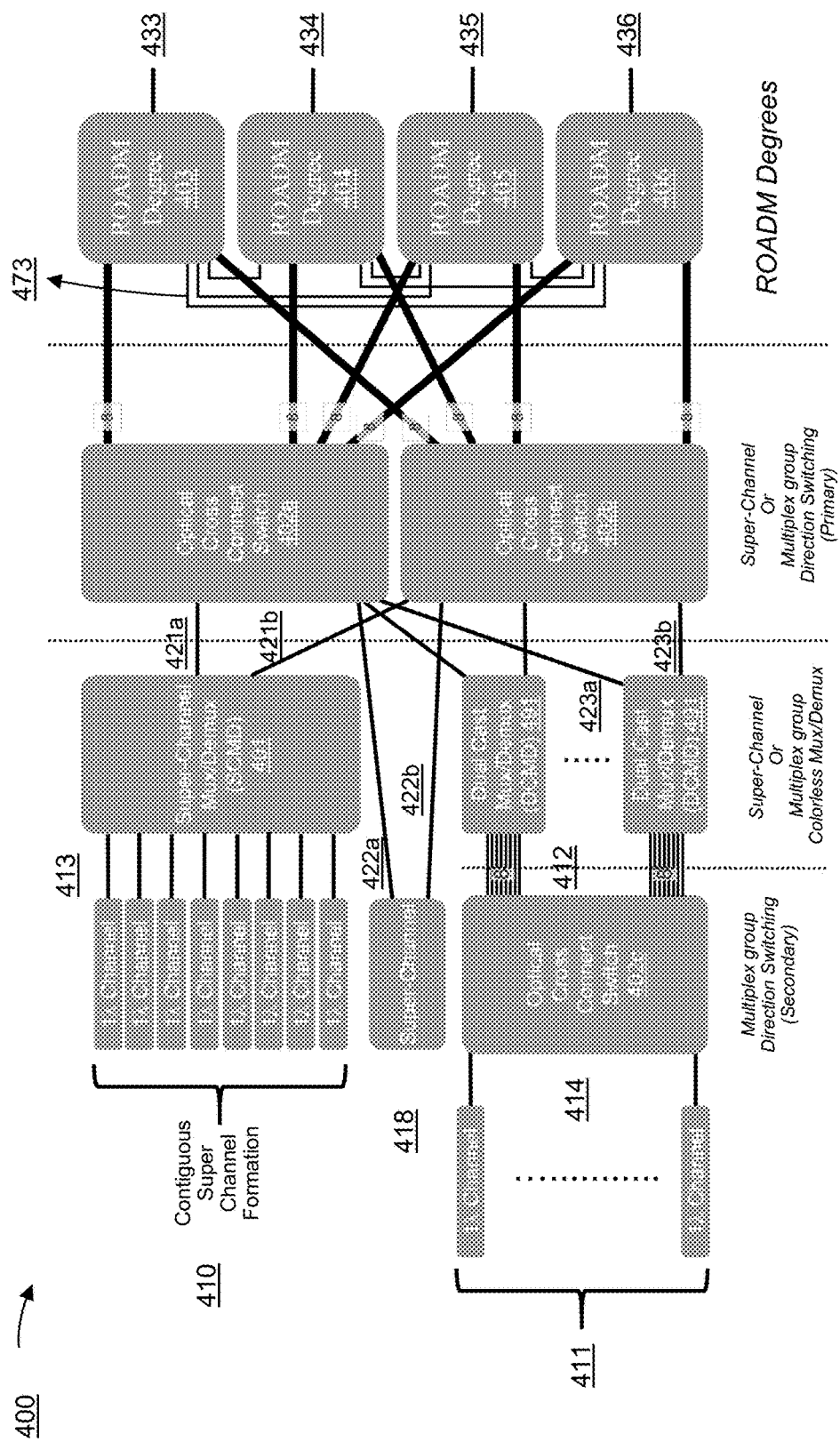
FIG. 4 is a block diagram illustrating a colorless, directionless, and super-channel contentionless (CDsC) ROADM node with channelized CDC ("CDcC") capabilities, according to an embodiment.

FIG. 4 is a block diagram illustrating a colorless, directionless, and super-channel contentionless (CDsC) ROADM node 400 with channelized CDC ("CDcC") capabilities, according to an embodiment. The CDsC ROADM node 400 with CDcC capabilities includes an optical fiber(s) carrying a set of contiguous single-carrier optical channels 410, a set of integrated super-channels 418 and a set of non-contiguous single-carrier optical channels 411, a super-channel multiplexer/demultiplexer (SCMD) 401, a set of dual-cast multiplexer/demultiplexer (DCMD) 491, a set of ROADM degrees 403-406, and a set of optical cross connect (OXC) switches 402a-402c. The CDsC ROADM node 400 with CDcC capabilities can provide CDC benefits to an optical network system with super-channels and individual channels simultaneously. In addition, similar to the CDsC ROADM node 200 in FIG. 2 and the CDsC ROADM node 300 in FIG. 3A, the CDsC ROADM node 400 with CDcC capabilities also provides dual-output for redundant connection and rapid restoration.

The set of contiguous single-carrier optical channels 410, the set of integrated super-channels 418, the SCMD 401, and the set of ROADM degrees 403-406 are structurally and functionally similar to the set of single-carrier optical channels 110-117, the set of integrated super-channels 118-120, the super-channel multiplexer/demultiplexer 101, and the set of ROADM degrees 103-106 in FIG. 1, respectively. The OXC switches 402a-402c are structurally and functionally similar to the OXC switch 102 in FIG. 1. In some instances, the OXC switches 402a and 402b can be configured to be located communicatively between the SCMD 401 and the set of ROADM degrees 403-406. In other words, data flow is communicated to the OXC switches 402a and 402b from the SCMD 401 and the data flow is output from the OXC switches 402a and 402b to the ROADM degrees 403-406.

The set of non-contiguous single-carrier optical channels 411 carries a set of non-contiguous single-carrier optical signals 412. Unlike the set of contiguous single-carrier optical channels 410, which use a contiguous part of the optical spectrum and are optically routed as a single "super-channel," the wavelengths of the set of non-contiguous single-carrier optical signals 412 in the set of non-contiguous single-carrier optical channels 411, in some instances, are not necessarily in a contiguous part of the optical spectrum. The set of DCMDs 491 can be configured to multiplex the set of non-contiguous single-carrier optical signals 412 into a set of groups of multiplexed optical signals 423a.

In use, the SCMD 401 receives a set of contiguous single-carrier optical signals 413 from an optical fiber(s) carrying the set of contiguous single-carrier optical channels 410. The SCMD 401 multiplexes the set of contiguous single-carrier optical signals 413 and generates a first super-channel optical signal 421a. In some instances, the SCMD 401 duplicates the first super-channel optical signal 421a to generate a second super-channel optical signal 421b. The SCMD 401 sends the first super-channel optical signal 421a to the first OXC switch 402a and sends the second super-channel optical signal 421b to the second OXC switch 402b. The first OXC switch 402a can receive a set of super-channel optical signals 422a from an optical fiber(s) carrying the set of integrated super-channels 418. The second OXC switch 402b can receive the duplicate set of super-channel optical signals 422b from the set of integrated super-channels 418. The super-channel optical signals 422a-422b received from the integrated super-channels 418 are not multiplexed by the SCMD 401.

The optical fiber(s) carrying the set of non-contiguous single-carrier optical channels 411 sends the set of non-contiguous single-carrier optical signals 414 to the OXC switch 402c. The OXC switch 402c routes each non-contiguous single-carrier optical signal from the set of non-contiguous single-carrier optical signals 414 to a DCMD of the set of DCMDs 491. In some instances, the OXC switch 402c can route each non-contiguous single-carrier optical signal 414 to a DCMD 491 based on a ROADM degree 403-406 to which the non-contiguous single-carrier optical signal 414 is destined. In other words, the OXC switch 402c can route a subset of non-contiguous single-carrier optical signals 414 to a first DCMD 491 when the subset of non-contiguous signal-carrier optical signals 414 are destined to a first ROADM degree 403. In some instances, a DCMD 491 can be uniquely associated with a ROADM degree from the set of ROADM degrees 403-406.

In other instances, the OXC switch 402c can route each non-contiguous single-carrier optical signal 414 to a DCMD 491 based on a wavelength from a set of wavelengths of the non-contiguous signal-carrier optical signal 414. In other words, the OXC switch 402c can route a first subset of non-contiguous single-carrier optical signals 414 to a first DCMD 491 when a range of wavelengths of the first subset of non-contiguous single-carrier optical signals 414 is within a first range. The OXC switch 402c can route a second subset of non-contiguous single-carrier optical signals 414 to a second DCMD 491 when a range of wavelengths of the second subset of non-contiguous single-carrier optical signals 414 is within a second range. The second range can be distinct from or overlapping with the first range.

The DCMD 491 can send the multiplexed optical signal 423a to the first OXC switch 402a and send a duplicate of the multiplexed optical signal 423b to the second OXC switch 402b. The first OXC switch 402a can then direct the super-channel optical signals 421a and 422a and the multiplexed optical signal 423a to the set of ROADM degrees 403-406 via the set of output ports (not shown in the figure) of the first OXC switch 402a. In some instances, in the event that the first OXC switch 402a fails or a connection coupled to the first OXC switch 402a fails, the second OXC switch 402b can also direct the super-channel optical signals 421b and 422b and the multiplexed optical signal 423b to the set of ROADM degrees 403-406. Similarly, in the event that the second OXC switch 402b fails or a connection coupled to the second OXC switch 402b fails, the first OXC switch 402a can also direct the super-channel optical signals 421a and 422a and the multiplexed optical signal 423a to the set of ROADM degrees 403-406. In other instances, the second OXC switch 402b can direct the super-channel optical signals 421b and 422b and the multiplexed optical signal 423b to the set of ROADM degrees 403-406 when the first OXC switch 402a is operational. The ROADM degrees 403-406 add or drop the received super-channel optical signals 421a-422b and the multiplexed optical signals 423a-423b and output the optical signals 433-436 to an optical network (not shown in the figure.) In some instances, pass-through connections exist from an output port of a ROADM degree 403-406 to the other ROADM degrees 403-406 such that optical signals 433-436 can be passed through other ROADM degrees 403-406. For example, an optical signal 433 can be transmitted to a ROADM degree 406 from the ROADM degree 403 via a pass-through connection 473.

Similar to the dual-plane OXC switch 202a-202b in FIG. 2, the dual-plane OXC switch 402a-402b supports 1+1 redundancy protection. Moreover, the dual-plane OXC switch 402a-402b supports 1+1 redundancy protection at the super-channel level and the individual channel levels. Similar to the CDsC ROADM node 100 in FIG. 1, the CDsC ROADM node 400 with CDcC capabilities also provides colorless, directionless, and contentionless benefits. In addition, the multi-layer switching (e.g., the dual-plane OXC switches 402a-402b being a primary layer of switching and the OXC switch 402c being a secondary layer of switching) provides flexible programmability and can be used in conjunction with existing super-channels that are managed by the primary switching layer. The multi-layer switching architecture provides a CDC solution that is efficient for both super-channel CDC and single channel CDC, and at the same time, manages the size of the OXC switches 402a-402b used for direction switching to provide a compact and manageable solution. For example, each layer of the multi-layer switching architecture in the CDsC ROADM node 400 with CDcC capabilities can be modular and can be added and/or removed without impact to the other layer. In some instances, the set of contiguous single-carrier optical channels 410 and the SCMD 401 can be removed and replaced with the set of non-contiguous single-carrier optical channels 411 and the set of dual-cast multiplexer/demultiplexer (DCMD) 491 for CDcC capabilities. Similarly, the set of non-contiguous single-carrier optical channels 411 and the set of dual-cast multiplexer/demultiplexer (DCMD) 491 can be removed and replaced with the set of contiguous single-carrier optical channels 410 and the SCMD 401 to provide switching for more super-channels.

Figure 5:
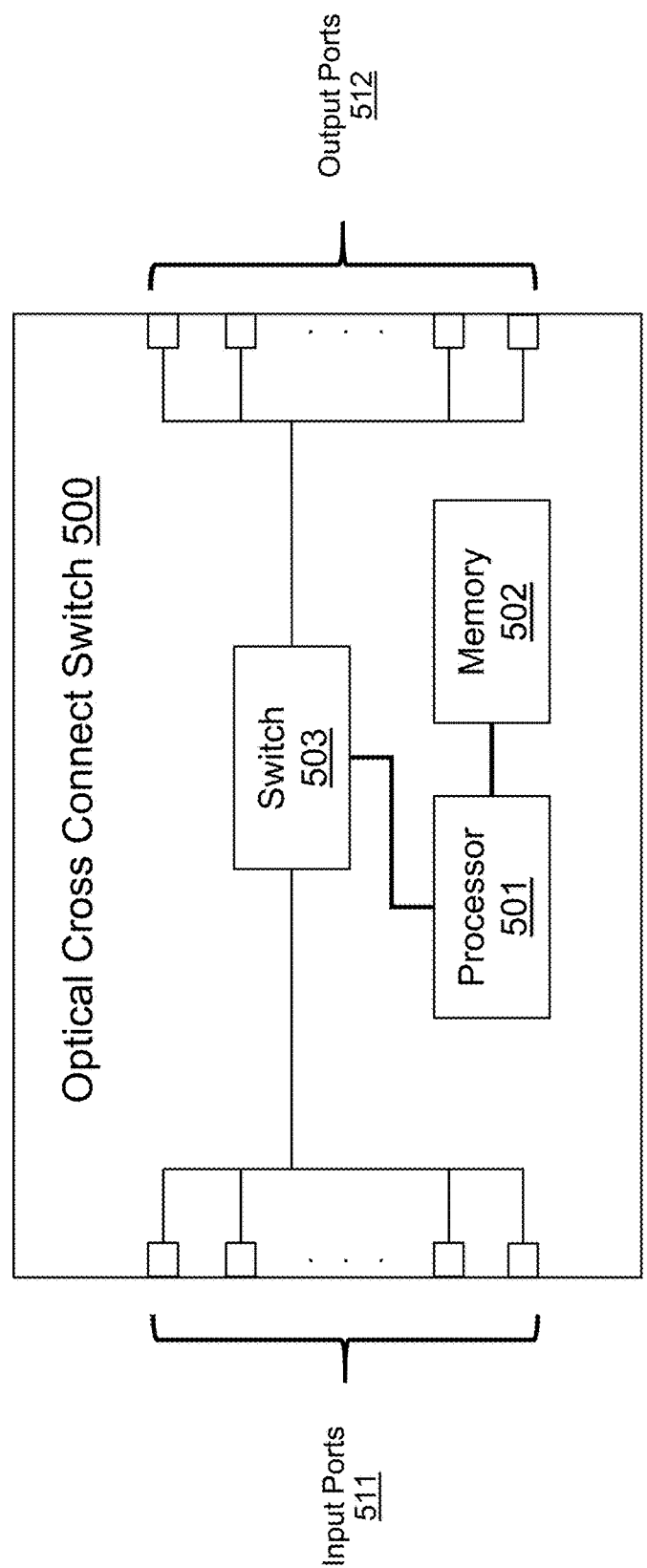
FIG. 5 is a block diagram illustrating an optical cross connect (OXC) switch, according to an embodiment.

FIG. 5 is a block diagram illustrating an optical cross connect (OXC) switch 500, according to an embodiment. The OXC switch 500 includes a processor 501, a memory 502, a switch 503, a set of input ports 511 (or a set of ingress ports), and a set of output ports 512 (or a set of egress ports). The switch 503 is operatively coupled to the set of input ports 511, the set of output ports 512, and the processor 501. The processor 501 is operatively coupled to the memory 502. The OXC switch 500 can be configured to be commutatively and/or operatively coupled to a super-channel multiplexer/demultiplexer (not shown in FIG. 5), a reconfigurable optical add-drop multiplexer (ROADM) degree (not shown in FIG. 5), an integrated super-channel (not shown in FIG. 5), and/or a dual-cast multiplexer/demultiplexer (not shown in FIG. 5). In some instances, the OXC switch 500 can be configured to be located between a super-channel multiplexer/demultiplexer (not shown in FIG. 5) and a ROADM degree (not shown in FIG. 5). The OXC switch 500 can be configured to be included in a colorless, directionless, and contentionless optical network (not shown in FIG. 5).

The processor 501 can be or include any processing device or component configured to perform the data collecting, processing and transmitting functions as described herein. The processor 501 can be configured to, for example, write data into and read data from the memory 502, and execute the instructions stored within the memory 502. Processor 501 can also be configured to execute and/or control, for example, the operations of the memory 502. In some implementations, based on the methods or processes stored within the memory 502 (e.g., in the form of code or instructions for processor 501), the processor 501 can be configured to execute a process, as described in FIG. 6.

The memory 502 can be, for example, a random-access memory (RAM) (e.g., a dynamic RAM, a static RAM), a flash memory, a removable memory, and/or so forth. In some embodiments, the memory 502 can include, for example, one or more of a database, process, application, virtual machine, and/or some other software modules (stored and/or executing in hardware) or hardware modules configured to execute a process. In such implementations, instructions to execute the process and/or the associated methods can be stored within the memory 502 and executed at the processor 501.

The number and arrangement of components shown in FIG. 5 are provided as an example. In some embodiments, there may be additional components, fewer components, different components, or differently arranged components than those shown in FIG. 5. For example, the OXC switch 500 can include an optical splitter (not shown in the figure).

In use, the switch 503 can receive a set of optical signals (not shown) via the set of input ports 511 and the processor 501 can send control signals to the switch 503 to route each optical signal from the set of optical signals to an output port from the set of output ports 512. The switch 503 can then send, based on the control signals from the processor 501, the optical signal to an optical device (e.g., a ROADM degree) operatively coupled to the OXC switch 500 via the output port. The optical signal from the set of optical signals can be a super-channel optical signal received from a super-channel multiplexer/demultiplexer (not shown in FIG. 5), a super-channel optical signal from an integrated super-channel (not shown) in FIG. 5, a single carrier optical signal received from an individual optical channel (not shown in FIG. 5), or a multiplexed optical signal received from a multiplexer/demultiplexer (not shown in FIG. 5; e.g., the DCMD 491 in FIG. 4).

In some instances, the OXC switch 500 can be symmetric with a number of the set of input ports 511 equal to a number of the set of output ports 512. In other instances, the OXC switch 500 can be asymmetric with a number of the set of input ports 511 different from a number of the set of output ports 512. In some implementations, as discussed herein with regards to FIGS. 2-5, a dual plane OXC switch can be used to provide redundant protection.

For example, for an OXC switch 500 having thirty-two (32) input ports and thirty-two (32) output ports and connected to four-direction ROADM degrees, a CDsC ROADM node can achieve 25% add/drop rate in every direction of the ROADM nodes. The CDsC ROADM node can achieve 50% add/drop rate in every direction of the ROADM nodes with an OXC switch 500 having sixty-four (64) input ports and sixty-four (64) output ports. The CDsC ROADM node can achieve 100% add/drop rate in every direction of the ROADM nodes with an OXC switch 500 having 128 input ports and 128 output ports.

In some instances, the OXC switch 500 can be configured to direct an optical signal to an output port from the set of output ports 512 based on a destination address where the optical signal is sent. The destination address can be associated with a device that is the next hop on the transmission path of the optical signal or a device that is the ultimate destination (e.g., a peripheral device across an optical network (not shown)) of the transmission path of the optical signal. In other instances, the OXC switch 500 can be configured to route an optical signal to an output port from the set of output ports 512 based on a wavelength of the optical signal (e.g., a single-carrier optical signal) or a wavelength range of a super-channel optical signal (or a multiplexed optical signal).

In some instances, at least one input port from the set of input ports 511 of the OXC switch 500 can be configured to be operatively coupled to an optical amplifier (not shown). The optical amplifier can amplify the super-channel optical signal received from a super-channel multiplexer/demultiplexer (not shown) to generate an amplified super-channel optical signal. The optical amplifier can send the amplified super-channel optical signal to the OXC switch 500. By placing the optical amplifier between the super-channel multiplexer/demultiplexer and the OXC switch 500, the CDsC ROADM node can provide an improved optical signal to noise ratio (OSNR) and save implementation costs of the optical network system.

Figure 6:
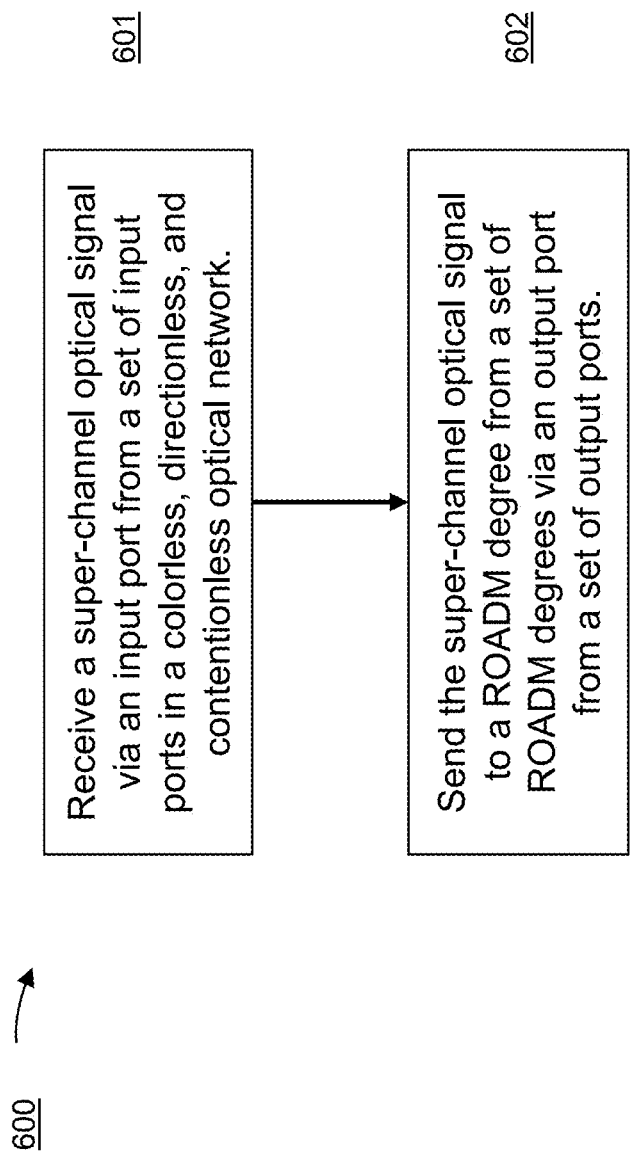
FIG. 6 is a flow chart illustrating a method of routing an optical signal by an optical cross connect (OXC) switch in a colorless, directionless, and contentionless optical network, according to an embodiment.

FIG. 6 is a flow chart illustrating a method of routing an optical signal by an optical cross connect (OXC) switch in a colorless, directionless, and contentionless optical network, according to an embodiment. The method 600 can be implemented at an OXC switch (e.g., the OXC switch 500 in FIG. 5).

At 601, the OXC switch receives a super-channel optical signal via an input port from a set of input ports in a colorless, directionless, and contentionless optical network. At 602, the OXC switch sends the super-channel optical signal to a ROADM degree from a set of ROADM degrees via an output port from a set of output ports. The super-channel optical signal can be received from a super-channel multiplexer/demultiplexer or an integrated super-channel. The OXC switch, in some instances, receives a single carrier optical signal received from an individual optical channel, or a multiplexed optical signal received from a multiplexer/demultiplexer (e.g., the DCMD 491 in FIG. 4).

The OXC switch can be commutatively and/or operatively coupled to a super-channel multiplexer/demultiplexer, a reconfigurable optical add-drop multiplexer (ROADM degrees), an integrated super-channel, and/or a dual-cast multiplexer/demultiplexer. In some instances, the OXC switch can be configured to be located communicatively between a super-channel multiplexer/demultiplexer and a ROADM degree. In other words, data flow is communicated to the OXC switch from the super-channel multiplexer/demultiplexer and the data flow is output from the OXC switch to the ROADM degree. The OXC switch can be configured to be included in a colorless, directionless, and contentionless optical network.

In some instances, the OXC switch can be symmetric with a number of the set of input ports equal to a number of the set of output ports. In other instances, the OXC switch can be asymmetric with a number of the set of input ports different from a number of the set of output ports. In some implementations, as discussed herein with regards to FIGS. 2-5, a dual plane OXC switch can be used to provide redundant protection.

For example, for an OXC switch having thirty-two (32) input ports and thirty-two (32) output ports and four-direction ROADM degrees, a CDsC ROADM node can achieve 25% add/drop rate in every direction of the ROADM nodes. The CDsC ROADM node can achieve 50% add/drop rate in every direction of the ROADM nodes with an OXC switch having sixty-four (64) input ports and sixty-four (64) output ports. The CDsC ROADM node can achieve 100% add/drop rate in every direction of the ROADM nodes with an OXC switch having 128 input ports and 128 output ports.

The OXC switch can direct an optical signal to an output port from the set of output ports based on a destination address where the optical signal is sent. The destination address can be associated with a device that is the next hop on the transmission path of the optical signal or a device that is the ultimate destination (e.g., a peripheral device across an optical network) of the transmission path of the optical signal. In other instances, the OXC switch can be configured to route an optical signal to an output port from the set of output ports based on a wavelength of the optical signal (e.g., a single-carrier optical signal) or a wavelength range of a super-channel optical signal (or a multiplexed optical signal).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:
1. A system, comprising:
   a super-channel multiplexer configured to multiplex a plurality of optical signals into a super-channel optical signal, each optical signal from the plurality of optical signals having a wavelength from a plurality of wavelengths, the plurality of wavelengths having a first wavelength bandwidth, the super-channel optical signal being a multi-carrier optical signal having a second wavelength bandwidth;

a first optical cross connect switch configured to be operatively coupled to the super-channel multiplexer and a reconfigurable optical add-drop multiplexer (ROADM) degree, the first optical cross connect switch configured to be located between the super-channel multiplexer and the ROADM degree, the first optical cross connect switch, the super-channel multiplexer, and the ROADM degree configured to be included in a colorless, directionless, and contentionless optical network, the first optical cross connect switch configured to switch, based on the second wavelength bandwidth, the super-channel optical signal to an output port from a plurality of output ports of the first optical cross connect switch, the first optical cross connect switch configured to transmit the super-channel optical signal from the output port to the ROADM degree, a second optical cross connect switch configured to be operatively coupled to the super-channel multiplexer and the ROADM degree, the second optical cross connect switch configured to receive the super-channel optical signal and transmit the super-channel optical signal to the ROADM degree for redundancy protection.

2. The system of claim 1, further comprising:

an optical amplifier configured to be operatively coupled to the super-channel multiplexer and the first optical cross connect switch and configured to be located between the super-channel multiplexer and the first optical cross connect switch, the optical amplifier configured to amplify the super-channel optical signal to generate an amplified super-channel optical signal, the optical amplifier configured to send the amplified super-channel optical signal to the first optical cross connect switch.

3. The system of claim 1, wherein the second wavelength bandwidth includes a bandwidth of 300 GHz.

4. The system of claim 1, wherein:

the super-channel optical signal is a first super-channel optical signal; and the first optical cross connect switch configured to receive a second super-channel optical signal from an integrated super channel, the second super-channel optical signal not being multiplexed by the super-channel multiplexer.

5. The system of claim 1, wherein:

the ROADM degree is a first ROADM degree;

the first ROADM degree is configured to (1) process the super-channel optical signal at the first ROADM degree or (2) transmit the super-channel optical signal to a second ROADM degree operatively coupled to the first ROADM degree.

6. The system of claim 1, wherein the first optical cross connect switch includes a plurality of input ports and the plurality of output ports, a number of the plurality of input ports being equal to a number of the plurality of output ports.

7. The system of claim 1, wherein the colorless, directionless, and contentionless optical network allows an optical signal with any optical wavelength within a predetermined range of wavelengths to be added to and dropped from the colorless, directionless, and contentionless optical network, the optical signal not being included in the plurality of optical signals.

8. The system of claim 1, wherein the colorless, directionless, and contentionless optical network allows an optical signal with any optical wavelength within a predetermined range of wavelengths to be redirected to any output port from a plurality of output ports of a ROADM node, the ROADM node having a plurality of ROADM degrees including the ROADM degree, the optical signal not being included in the plurality of optical signals.

9. The system of claim 1, wherein the colorless, directionless, and contentionless optical network allows a first optical signal from the plurality of optical signals and a second optical signal from the plurality of optical signals to be added and dropped without colliding, the first optical signal having a same wavelength from the plurality of wavelengths as the second optical signal.

10. A system comprising:

a super-channel multiplexer configured to multiplex a plurality of optical signals into a super-channel optical signal, each optical signal from the plurality of optical signals having a wavelength from a plurality of wavelengths, the plurality of wavelengths having a first wavelength bandwidth, the super-channel optical signal being a multi-carrier optical signal having a second wavelength bandwidth; and an optical cross connect switch configured to be operatively coupled to the super-channel multiplexer and a reconfigurable optical add-drop multiplexer (ROADM) degree, the optical cross connect switch configured to be located between the super-channel multiplexer and the ROADM degree, the optical cross connect switch, the super-channel multiplexer, and the ROADM degree configured to be included in a colorless, directionless, and contentionless optical network, the optical cross connect switch configured to switch, based on the second wavelength bandwidth, the super-channel optical signal to an output port from a plurality of output ports of the optical cross connect switch, the optical cross connect switch configured to transmit the super-channel optical signal from the output port to the ROADM degree, the ROADM degree is included in a ROADM node having (1) at least four ROADM degrees and (2) at least twenty ports, the optical cross connect switch includes at least thirty-two input ports and at least thirty-two output ports causing a 50% add or drop for each ROADM degree from the at least four ROADM degrees.

11. An apparatus, comprising:

a plurality of input ports, at least one input port from the plurality of input ports configured to be operatively coupled to a super-channel multiplexer;

a plurality of output ports configured to be operatively coupled to a plurality of reconfigurable optical add-drop multiplexer (ROADM) degrees; and a processor operatively coupled to the plurality of input ports and the plurality of output ports and configured to be included in a colorless, directionless, and contentionless optical network, the processor configured to receive a super-channel optical signal from the super-channel multiplexer via the at least one input port from the plurality of input ports, the super-channel optical signal being generated by multiplexing a plurality of optical signals, each optical signal from the plurality of optical signals having a wavelength from a plurality of wavelengths, the plurality of wavelengths having a first wavelength bandwidth, the super-channel optical signal being a multi-carrier optical signal having a second wavelength bandwidth, the processor configured to send, based on the second wavelength bandwidth, the super-channel optical signal to a ROADM degree from the plurality of ROADM degrees via an output port from the plurality of output ports, the plurality of input ports including at least thirty-two input ports;

the plurality of output ports including at least thirty-two output ports; and the plurality of ROADM degrees being included in a ROADM node having at least four ROADM degrees, the ROADM node having at least twenty ports, and at least 50% add or drop for each ROADM degree from the plurality of ROADM degrees.

12. The apparatus of claim 11, wherein:

the at least one input port from the plurality of input ports is configured to be operatively coupled to an optical amplifier, and the processor is configured to receive an amplified super-channel optical signal from the optical amplifier, the amplified super-channel optical signal being an amplified version of the super-channel optical signal generated by the optical amplifier based on the super-channel optical signal from the super-channel multiplexer.

13. The apparatus of claim 11, wherein a number of the plurality of input ports is equal to a number of the plurality of output ports.

14. The apparatus of claim 11, wherein the colorless, directionless, and contentionless optical network allows an optical signal with any optical wavelength within a predetermined range of wavelengths to be added to and dropped from the colorless, directionless, and contentionless optical network.

15. The apparatus of claim 11, wherein the colorless, directionless, and contentionless optical network allows an optical signal with any optical wavelength within a predetermined range of wavelengths to be redirected to any output port from a plurality of output ports of a ROADM node, the ROADM node having the plurality of ROADM degrees.

16. The apparatus of claim 11, wherein the colorless, directionless, and contentionless optical network allows a first optical signal and a second optical signal to be added and dropped without colliding, the first optical signal having a same wavelength as the second optical signal.

* * * * *